United States Patent [19]

Anderson et al.

[11] 4,375,313

[45] Mar. 1, 1983

[54] FIBER OPTIC CABLE AND CORE

[75] Inventors: Ronald A. Anderson; Robert M. Shapiro, both of Houston, Tex.

[73] Assignee: Schlumberger Technology Corporation, Houston, Tex.

[21] Appl. No.: 189,971

[22] Filed: Sep. 22, 1980

[51] Int. Cl.³ .......................... G02B 5/14; G02B 5/16
[52] U.S. Cl. .................................. 350/96.23; 174/109
[58] Field of Search ................ 350/96.23, 96.24, 9.10; 174/108, 109, 106 R; 250/227

[56] References Cited

U.S. PATENT DOCUMENTS

| | | | |
|---|---|---|---|
| 298,751 | 5/1884 | Harrington | 174/109 |
| 2,344,501 | 3/1944 | Bennett | 174/106 R |
| 3,750,058 | 7/1973 | Bankert, Jr. et al. | 333/242 |
| 3,955,878 | 5/1976 | Nowak | 350/92.23 |
| 4,054,365 | 10/1977 | Marx et al. | 350/96.23 |
| 4,076,382 | 2/1978 | Oestreich | 350/96.23 |
| 4,097,119 | 6/1978 | Kumamaru et al. | 350/96.23 |
| 4,146,302 | 3/1979 | Jachimowicz | 350/96.23 |
| 4,147,406 | 4/1979 | Anderson | 350/96.23 |
| 4,171,868 | 10/1979 | Hensel et al. | 350/96.23 |
| 4,184,743 | 1/1980 | Baker et al. | 350/96.23 |

FOREIGN PATENT DOCUMENTS

2018454 10/1979 United Kingdom ............. 350/96.23

OTHER PUBLICATIONS

Meisner–"Computers and Advanced Technology Applied to Uranium Borehole Logging Systems", 1980 Midcom Professional Program, Session 32; Dallas Convention Center, Nov. 4-6, 1980; pp. 1-15.

*Primary Examiner*—Marvin L. Nussbaum

[57] ABSTRACT

A cable adapted for well logging has an optical fiber core in which the optical fibers are protected from moisture and non-uniform stresses by first wrapping the fibers in a helical spiral around a solid, soft, deformable core material and then blanketing them with more of the same. Next the blanketed core is closely and tightly wound with several overlapping layers of a metallic tape jacket. The jacket buffers radial loads applied by other portions of the cable and forms a barrier against moisture penetration. The soft core and blanket have properties close to a liquid so that only uniform, essentially hydrostatic stresses are transmitted to the optical fibers.

13 Claims, 2 Drawing Figures

FIBER OPTIC CABLE AND CORE

BACKGROUND OF THE INVENTION

This invention relates to fiber optic communication cables, and more particularly to a fiber optic cable structure adapted for well logging for measuring characteristics of earth formations in a borehole.

As an oil well is being drilled, a sonde is usually lowered periodically into the borehole to measure characteristics of the earth formations it traverses. Typically, a logging cable supports and moves the sonde within the borehole, carries power for the sonde, and relays control instructions and data between the sonde and instrumentation and control facilities at the surface of the earth. As measurements and measuring instruments have become more sophisticated, data transmission rates have increased to the point where existing electrical cables can become saturated.

Fiber optic technology can increase data transmission rates several orders of magnitude, as has been demonstrated by fiber optic telephone cables. Due to the demanding conditions under which a well logging cable is used, however, telephonic fiber optic cables would ordinarily not be acceptable. Telephone cables are designed to remain stationary in use and not to encounter the extremes of temperature and pressure found in an oil well.

In contrast, a well logging cable is repeatedly pulled around sheave wheels and wound onto and off a winch drum as it is lowered into and lifted out of wells. The cable must therefore withstand repeated bending around diameters of but a few feet, and tensions of thousands of pounds. Once in the well, the cable encounters pressures which may exceed twenty thousand pounds per square inch and temperatures which may exceed 175° C. Optical fibers, however, are extremely sensitive to deformation (especially point stresses), which greatly increase the attenuation of the optical signals within the fiber. They are also sensitive to moisture, which attacks micro-cracks in the fibers, reduces their strength, and increases their attenuation. While the cable is being manufactured, and later when in use, the stresses (bending and stretching) on the cable components (electrical conductors, strength members, etc.) move them relative to one another within the cable. This can cause local deformations of the optical fibers. Stretching the cable stretches the fibers, thereby increasing their stress, aggravating their attenuation, and sometimes causing them to break. The high pressures and temperatures within the well assist moisture in invading the cable and the optical fibers. As indicated, typical optical telephonic communication cables are not designed for these operating conditions.

Improved optical fiber cable structures have been proposed, but a need still remains for even better buffering for the optical fibers against stresses and better moisture protection in a cable specifically suited for repetitive and demanding well logging applications.

BRIEF DESCRIPTION OF THE INVENTION

Briefly, the present invention meets the above needs and purposes with a cable and a fiber optic cable core construction in which each optical fiber is surrounded by a solid but soft elastomeric cushion, and the cushioned optical fibers are themselves surrounded with closely and spirally wound overlapping steel tape jackets. This protects and buffers the optical fibers from point stresses and other forces within a cable and forms a barrier against the entry of moisture into the cushion and the optical fibers.

More specifically, in a preferred embodiment an elastomeric core such as unfilled Viton (a trademark of E. I. Dupont De Nemours & Co.) rubber supports a plurality of optical fibers wrapped therearound in a helical spiral. A blanket of the same material surrounds the core and fibers and cooperates with the core to protect the fibers from point stresses and transmit forces thereto essentially hydrostatically.

The closely and spirally wound tape jackets which surround the core, fibers, and blanket are each wound in the same direction. Succeeding jackets after the first overlap the spiral cuts of the preceding layer to maximize the labyrinthine path length which moisture must travel to penetrate the tape jackets and reach the optical fibers. In the preferred embodiment, the tape layers are each formed of metal tape and the outermost metal tape layer is coated with a fused controlled melting point alloy to seal the core against moisture penetration.

It is therefore an object of the present invention to provide an improved cable adapted for use in measuring characteristics of earth formations in a borehole, and an improved fiber optic core therefor; a core in which each optical fiber is surrounded and buffered by a solid, soft elastomeric cushion; in which the cushion is surrounded by at least one closely and spirally wound tape jacket; in which subsequent tape jacket layers are wound in the same direction as, tightly surround, and overlap the spiral cuts of the preceding layers; in which the cushion and jackets cooperate to buffer each optical fiber from point stresses and other forces within a logging cable and to form a barrier against the entry of moisture into the fibers; in which at least the outermost tape layer may be a metallic tape layer coated with a fused controlled melting point alloy to seal the core against moisture penetration; and to accomplish the above objects and purposes in a versatile and reliable structure and method readily suited for logging cable applications in even the most demanding well logging environments.

Other objects and advantages of the invention will be apparent from the following description, the accompanying drawings and the appended claims.

DESCRIPTION OF THE PREFERRED EMBODIMENTS

Figure 1:
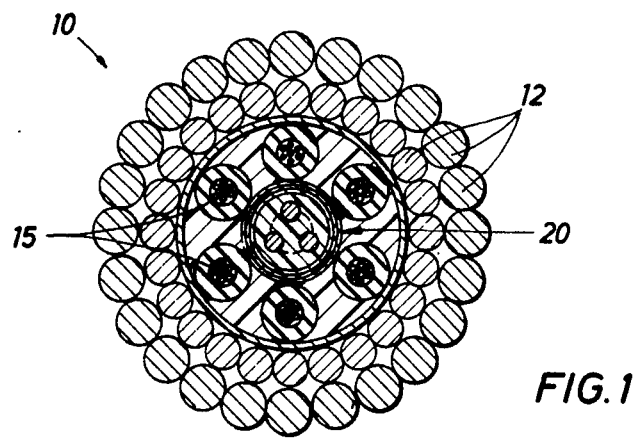
FIG. 1 is a cross-sectional view of a well logging cable containing a fiber optic core according to the invention.
Figure 2:
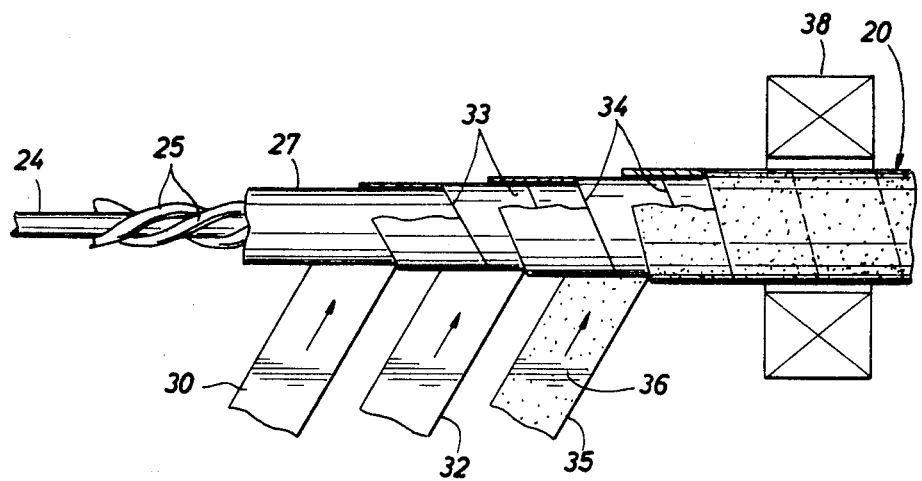
FIG. 2 is a perspective diagrammatic illustration showing sequentially the manufacture of the fiber optic core.

With reference to the drawings, as well logging cable 10 includes one or more outer strength and armor layers 12 surrounding a plurality of electrical conductors 15. In the preferred embodiment according to this invention, a fiber optic core assembly 20 is located at the center of cable 10. Core assembly 20 (FIG. 2) includes a solid, soft elastomeric cushioning core 24, formed of a material which transmits forces essentially hydrostatically. Materials suitable for this purpose would be any of several elastomers, such as Viton rubber, a fluorocarbon elastomer manufactured by Dupont. One or more optical fibers 25 are wrapped in a helical spiral about core 24, and a solid, elastomeric cushioning blanket 27, preferably of the same material as core 24, surrounds the fibers and core and cooperates therewith to protect the fibers from point stresses and transmit forces to them essentially hydrostatically.

Around the blanket is a closely and spirally wound tape jacket 30, preferably formed of metal (although the tape may be made of other suitable materials such as various plastics). A metal suitable for this purpose would be a precipitation hardening stainless steel such as 75% iron, 16% chromium, 5% nickel, 4% copper, and trace elements. Additional or subsequent tape layers 32 are closely wound around the core 24, fibers 25, blanket 27 and first tape layer 30 in the same direction and spaced to overlap the respective preceding spiral cuts 33 and 34 (FIG. 2) of the preceding tape layers. The tape layers cooperate with one another and with the blanket and core to buffer the optical fibers from point stresses and other forces within the logging cable and to form a barrier against the entry of moisture into the elastomeric cushioning means and the optical fibers.

In the preferred embodiment, the outermost tape layer 35 is coated with a controlled melting point alloy 36 before it is wound onto the preceding layer. After it is wound onto layers 30 and 32 (and becomes part of core 20) it is passed through an induction heating coil 38 where it is briefly heated to a temperature exceeding the melting point of the alloy coating 36. The alloy melts and fuses to form an even better seal for the core assembly 20 against moisture penetration.

In the preferred embodiment the controlled melting point alloy 36 is a lead based alloy because lead has enhanced deformation tolerance and water resistance. This is important because of the considerable stretching and bending which a logging cable undergoes during well logging operations. The enormous plastic deformation tolerance of the lead substantially improves the integrity of the fused alloy barrier under these conditions. A suitable alloy for this coating would be 97.5% lead, 1.5% silver, and 1% tin, having a melting point of 310° C.

The term "controlled melting point" is chosen since the alloy must not melt at borehole temperatures (typically 175° C. or higher), and yet must be readily and quickly fused by the induction coil 38 without heat damaging the elements in the fiber optic core assembly 20 (especially the cushioning core 24 and blanket 27). Preferably, the assembly 20 is moved through induction coil 38 quickly so that the outermost tape layer 35 is brought rapidly to the melting point of the alloy coating 36 and then moved away from coil 38 before much heat can penetrate the inner tape layers 32 and 30. The heat in the outermost layer 35 then quickly dissipates, or can be force cooled, with little net transfer of heat energy to the interior of the fiber optic core assembly 20.

As may be seen, therefore, the present invention has numerous advantages. The fiber optic core assembly 20 can be used in a variety of cable configurations. It buffers the optical fibers from point stresses both during cable manufacturing and later when in use. It protects the fibers from moisture, and, due to the helical spiral configuration of the fibers, accommodates repeated flexing and stretching of the cable. Other means for increasing the length of the optical fibers relative to the cable, such as a zig-zag rather than spiral configuration, may of course be used. Fillers (e.g., silicone rubber) may be used in the cushioning material (core 24 and blanket 27) to increase the compressibility. Under proper circumstances, even a single tape layer having the fused alloy coating can be considered. Further, as indicated, although the preferred embodiment uses several tape layers of stainless steel, other materials, such as certain polymers, super alloys, metallic glasses, metals such as titanium, and so forth, may be used. When inner layers of such materials are intrinsically fusible, they could be controllably fused along with the outermost layer. The cable construction containing the fiber optic core assembly 20 may include other cable members such as conductors 15, armor and strength members 12, and so on, from which the optical fibers 25 are protected and buffered.

Therefore, while the methods and forms of apparatus herein described constitute preferred embodiments of this invention it is to be understood that the invention is not limited thereto, and that changes may be made therein without departing from the scope of the invention.

What is claimed is:

1. A fiber optic core for a logging cable, comprising:
    (a) at least one optical fiber,
    (b) a cushioning core,
    (c) each said optical fiber being wrapped in a helical spiral about said cushioning core,
    (d) soft, elastomeric cushioning means including a blanket surrounding said cushioning core and optical fibers for protecting each said fiber from point stresses and for transmitting forces thereto essentially hydrostatically,
    (e) a first closely and spirally wound tape jacket forming a first layer surrounding said cushioning means, and
    (f) at least one additional closely and spirally wound tape jacket forming another layer, each subsequent tape layer tightly surrounding the preceding layer and being wound in the same direction to overlap the spiral cuts of the preceding layer and cooperate therewith to buffer said optical fiber from point stresses and other forces within a logging cable and to form a barrier against the entry of moisture into said cushioning means and fiber.

2. The structure of claim 1 wherein said tape jackets are metal tape jackets.

3. The structure of claim 2 wherein the outermost metal tape layer is coated with a fused controlled melting point alloy to seal the core against moisture penetration.

4. A fiber optic core for a logging cable, comprising:
    (a) at least one optical fiber,
    (b) a cushioning core,
    (c) each said optical fiber being wrapped in a helical spiral about said cushioning core,
    (d) soft, elastomeric cushioning means including a blanket surrounding said cushioning core and optical fibers for protecting each said fiber from point stresses and for transmitting forces thereto essentially hydrostatically,
    (e) a closely and spirally wound metal tape jacket surrounding said cushioning means to buffer said optical fiber from point stresses and other forces within a logging cable, and
    (f) a fused, controlled melting point alloy coating on said tape jacket and cooperating therewith to form a barrier and seal the core against the entry of moisture into said cushioning means and fiber.

5. The structure of claim 3 or 4 wherein said alloy is lead based for enhanced deformation tolerance and water resistance.

6. The structure of claim 1 or 4 wherein said cushioning means comprises unfilled Viton rubber.

7. A logging cable, comprising:
(a) a fiber optic core having:
   (i) a solid, soft elastomeric cushioning core,
   (ii) a plurality of optical fibers each wrapped in a helical spiral about said cushioning core,
   (iii) a solid, soft elastomeric cushioning blanket surrounding said cushioning core and fibers and cooperating with said cushioning core to protect said fibers from point stresses and transmit forces thereto essentially hydrostatically,
   (iv) a plurality of closely and spirally wound metal tape jackets forming successive layers surrounding said cushioning core, fibers, and blanket, each successive layer after the first tightly surrounding the preceding layer and being wound in the same direction to overlap the spiral cuts of the preceding layer and cooperate therewith to buffer said optical fibers from point stresses and other forces within the logging cable and to form a barrier against the entry of moisture into said elastomeric cushioning means and said optical fibers, and
   (v) the outermost metal tape layer being coated with a fused, lead based, controlled melting point alloy to seal said fiber optic core against moisture penetration, and
(b) cable strength and armoring means surrounding said fiber optic core.

8. For use in manufacturing fiber optic containing logging cables, a method for preparing a fiber optic core, comprising:
(a) wrapping each fiber of the fiber optic core in a helical spiral about a core of elastomeric cushioning material,
(b) blanketing the fiber and core with more of the elastomeric cushioning material to surround the fibers with a soft elastomeric cushion for protecting each fiber from point stresses and transmitting forces thereto essentially hydrostatically,
(c) surrounding the fiber and cushion with a first layer of a closely and spirally wound tape jacket, and
(d) tightly winding at least one additional closely and spirally wound tape jacket layer onto, in the same direction, and overlapping the spiral cuts of the preceding layer to cooperate therewith to buffer each optical fiber from point stresses and other forces within a logging cable and to form a barrier against the entry of moisture into the elastomeric cushion and fiber.

9. The method of claim 8 wherein said surrounding and winding steps further comprise surrounding and winding with metal tape jacket layers.

10. The method of claim 9 further comprising:
(a) coating the outermost metal tape layer with a controlled melting point alloy before it is wound onto the preceding layer, and
(b) heating the outermost tape layer after it is wound to fuse the alloy and seal the core against moisture penetration.

11. For use in manufacturing fiber optic containing logging cables, a method for preparing a fiber optic core, comprising:
(a) wrapping each fiber of the fiber optic core in a helical spiral about a core of elastomeric cushioning material,
(b) blanketing the fiber and core with more of the elastomeric cushioning material to surround the fibers with a soft elastomeric cushion for protecting each fiber from point stresses and transmitting forces thereto essentially hydrostatically,
(c) surrounding the fiber and cushion with a layer of a closely and spirally wound metal tape jacket having a controlled melting point alloy coating to buffer each optical fiber from point stresses and other forces within a logging cable, and
(d) heating the outermost tape layer after it is wound to fuse the alloy for cooperating with the tape to form a barrier and seal the core against the entry of moisture into the elastomeric cushion and fiber.

12. The method of claim 10 or 11 wherein the alloy is lead based for enhanced deformation tolerance and water resistance.

13. A method for manufacturing fiber optic containing logging cables, comprising:
(a) wrapping a plurality of optical fibers in helical spirals about a solid soft elastomeric cushioning core and blanketing the fibers and core with more of the elastomeric cushioning material to protect each fiber from point stresses and transmit forces thereto essentially hydrostatically,
(b) surrounding the core, fibers, and blanket with a plurality of closely and spirally wound metal tape jacket layers, each successive layer after the first being tightly wound in the same direction and overlapping the spiral cuts of the preceding layer to cooperate therewith to buffer each optical fiber from point stresses and other forces within the logging cable and form a barrier against the entry of moisture into the elastomeric cushioning material and optical fibers,
(c) coating the outermost metal tape layer with a lead based, controlled melting point alloy before it is wound onto the preceding layer,
(d) heating the outermost tape layer after it is wound to fuse the alloy and seal against moisture penetration, and
(e) surrounding the metal tape jackets with cable strength and armoring members.

* * * * *